Oct. 8, 1957  F. C. MITTELL ET AL  2,809,080
ANTI-EXTRUSION DEVICE FOR ANNULAR SEALS
Filed Nov. 23, 1953

*INVENTORS*
FRANK C. MITTELL
ROBERT J. CULLETON
BY
*William L. Lane*
ATTORNEY

United States Patent Office 2,809,080
Patented Oct. 8, 1957

2,809,080
ANTI-EXTRUSION DEVICE FOR ANNULAR SEALS

Frank C. Mittell and Robert J. Culleton, Los Angeles, Calif., assignors to North American Aviation, Inc.

Application November 23, 1953, Serial No. 393,822

4 Claims. (Cl. 309—23)

This invention pertains to an anti-extrusion device for annular seals and more particularly to a back-up member for use with an O-ring type of seal for either static or dynamic applications.

In hydraulic systems where an O-ring seal is used, it is necessary to employ some sort of back-up member which will act as an anti-extrusion device. This is because of the clearances which are inherently present in such devices. For example, between a piston and a cylinder, there will naturally be a certain amount of clearance due to manufacturing tolerances to permit assembly, and to accommodate expansion due to heat. Without a back-up, anti-extrusion member in the groove with the O-ring seal for such a piston, the pressure within the system will cause the O-ring to be extruded out of its groove through the clearance spaces. The usual procedure in the past has been to employ a leather ring as a back-up member which would serve to prevent the O-ring seal from extruding out of its groove. However, leather back-up rings are good only up to around 200° F. above which temperature they deteriorate rapidly. It is also difficult to install these leather rings in many cases because they must be stretched prior to taking their place within the groove with the O-ring. Often a permanent deformation of the leather back-up member is obtained as a result of this stretching. Various procedures may then be followed in an effort to return the leather ring to its original shape, such as soaking in hot oil for a period of time, but even so it may be impossible to erase the effects of the stretching of the leather ring. A further difficulty with the leather back-up rings is that they tend to shed small bits of material which may clog the hydraulic system in which they are used.

Accordingly, it is an object of this invention to provide an anti-extrusion device for annular seals which is resistant to high temperatures.

Another object of this invention is to provide an anti-extrusion device which may be installed without damage thereto.

A further object of this invention is to provide an anti-extrusion device with little tendency to shed bits of material.

Yet another object of this invention is to provide an anti-extrusion device having a particularly low coefficient of friction.

A still further object of this invention is to provide an anti-extrusion device which will result in increased life for an annular seal.

These and other objects will become apparent from the following detailed description taken in connection with the accompanying drawing in which.

Figure 1:
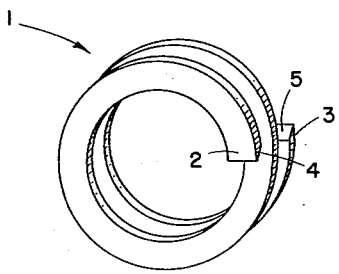
Fig. 1 is a perspective view of the back-up member slightly extended.
Figure 2:
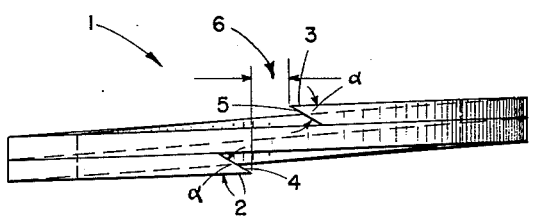
Fig. 2 is a side elevation of the back-up member.

The anti-extrusion device of this invention is comprised of a member 1 which is shown in its free form in Fig. 1. It can be seen that this member is helical in contour, consisting of two or more turns. This member should be rectangular in cross section. Preferably it is made of polytetrafluoroethylene, which is more commonly known by its commercial name Teflon. One of the advantages of this material is that when the member is comprised of Teflon it can be operated at temperatures as high as 500° F. without damage thereto.

Ends 2 and 3 of member 1 are scarfed or beveled forming undercut surfaces 4 and 5, respectively. Each of these surfaces thereby forms an angle alpha with the adjacent outer radial face of member 1, this angle being approximately 30° in the preferred embodiment. The ends are cut so as to provide a gap 6 therebetween, with the edges of the ends parallel and straddling a radius of the helical member. The reasons for this particular construction will be made more clear below.

It is a simple matter to install the helical back-up member 1 in any type of groove with an O-ring, and further to assemble parts with which the back-up member is associated. For example, if the back-up member is placed within the groove of a piston, the helix may be slightly opened or unwound in order to permit the member to slide over the exterior of the piston, following which it will assume its original shape within the groove of the piston. If the piston is then installed within a cylinder, by rotation of the piston in the proper direction the helix can be closed or wound up slightly so that it will readily fit within the walls of the cylinder.

Figure 4:
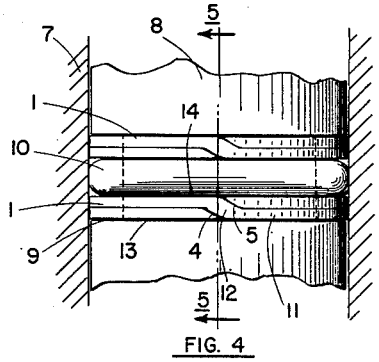
Fig. 4 is a side elevation of the back-up members as used with an O-ring seal.
Figure 3:
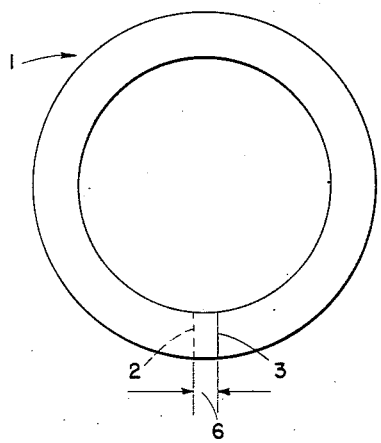
Fig. 3 is a top plan view of the back-up member.
Figure 5:
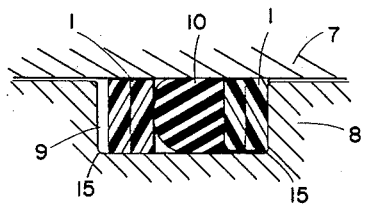
Fig. 5 is a sectional view taken along line 5—5 of Fig. 4.

As illustrated in Figs. 4 and 5, two of members 1 are installed inside a cylinder 7 around a piston 8 in external groove 9 thereof. When two back-up members are used in this manner they will prevent extrusion of the O-ring from pressure in either direction. O-ring 10 is adjacent the back-up member. The back-up member is dimensioned so that in radial direction it substantially fills the groove. When the piston and cylinder assembly is then subsequently subjected to pressure, the helical member 1 will be axially compressed. When this occurs ends 2 and 3 of member 1 are caused to lie adjacent inner portion 11 thereof which assumes a curve at the location of the ends, as indicated at 12. As a result, back-up member 1 presents smooth radial exterior surfaces 13 and 14.

An angle of 30° is chosen for the undercut, beveled ends of member 1 because it has been found by experiments that Teflon, for such application, tends to naturally assume such an angle at portion 11 thereof. When the ends are beveled to 30° it is a simple matter for them to lie adjacent the curved portion 12 of member 1 so that smooth exterior surfaces 13 and 14 are presented thereby. If the ends of member 1 are beveled to a lesser angle so that they are in effect sharper and thinner, there will be slightly more tendency for the ends to extrude out of the groove 9 in the piston. At a greater angle than 30°, it is more difficult for the center portion to assume the proper bend at 12 so that there is less ability to present a smooth outer surface.

The provision that the ends are parallel and straddle a radius of the helix is also very important. This means that when the inner portion bends, and the end faces lie against this inner portion, there will be no wedging effect as would be the case if the ends were cut in a radial direction. In other words, by the parallel cut there is given as much room at the bottom or inner edge of portion 11 for the helical member to bend as there is provided at the top. This allows a smooth bend and a perfectly flat exterior radial surface. The particular spacing for gap 6 between the ends depends, of course, upon the thickness of the material. It should be chosen in any event so that the ends of the helix can lie adjacent inner portion 11 without presenting at any portion of member 1 more than two thicknesses of material in an axial direction, and with sufficient spacing to permit portion 12 to assume its bend.

The provisions discussed above whereby perfectly flat and smooth radial faces 13 and 14 are provided, are important for both static and dynamic applications of the seal. Without the flat exterior surfaces as described the relatively soft O-ring material will be cut by the back-up member when it is subjected to pressure. Any sharp corners are very destructive of an O-ring annular seal and decrease its life materially. For dynamic operations, wherein the seal is moved relative to another part, it is even more important that the back-up member present a flat surface against the O-ring. Naturally, there is more tendency for a cutting action to take place if the O-ring is in movement. It has been found that with the helix of Teflon material as a back-up member, such a low amount of friction is present between the O-ring and back-up member that when the piston is in movement the O-ring actually rolls along the surface of the cylinder, rotating against the side of the Teflon back-up member. Sharp edges would destroy the O-ring within a very short time for such operations. This rolling action means that the O-ring slides on the smooth, friction-free Teflon surface rather than on a metal part, and its life is accordingly greatly increased. Another beneficial effect comes from the fact that the Teflon in movement deposits minute quantities of its own material on the surfaces which it contacts. These particles of material form a low friction coating which enables the parts to move freely, thereby decreasing the internal friction of the hydraulic device. The quantity of material which member 1 loses in this manner is actually quite small and will in no sense damage this member. At the same time the Teflon material will not shed as does the leather back-up material whereby the attendant disadvantages of shedding are overcome.

It may be observed, as indicated at 15, that the groove in which the O-ring and back-up members are disposed has a radius at each corner thereof where the radial faces meet the circumferential face of the groove. When the Teflon back-up member, which is not as soft as the leather back-up members normally used, contacts this radius as the O-ring forces it against the side of the groove it will tend to ride up on the radius thereby being forced into tighter engagement with the wall of the cylinder.

Also, the O-ring, in attempting to flow through the gap on the low pressure side of the groove, will generate a radial force component urging the back-up member against the cylinder wall. The effectiveness of member 1 as an anti-extrusion device is therefore enhanced because the gap between the cylinder and piston becomes more tightly closed.

Figure 6:
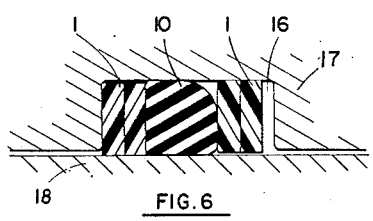
Fig. 6 is a sectional view of the back-up members associated with an internal groove.

This back-up member will obviously work as well for an internal groove, in a cylindrical member itself, as for the groove in a piston or shaft. Groove 16 of Fig. 6 is disposed in a cylinder 17 for sealing around shaft 18. It is immaterial to the operation of the helical back-up member which type of groove it is disposed in or whether the seal is static or dynamic. In any event the advantages outlined above are retained. The member is resistant to high temperatures; it is easy to install; it does not assume a permanent deformation during installation; it provides a low-friction surface and presents smooth, radial surfaces which will not cut or damage an annular seal.

The foregoing detailed description is to be clearly understood as given by way of illustration and example only, the spirit and scope of this invention being limited only by the appended claims.

We claim:

1. An anti-extrusion device for an annular groove sealing member, said device comprising a polytetrafluoroethylene helical member of two turns adapted to lie in a groove adjacent a sealing member, said member being dimensioned to substantially fill said groove in a radial direction, said member being of substantially rectangular cross section with each end thereof undercut at a substantially 30 degree angle to its outer radial surface, whereby when said member is subjected to axially compressive forces the portion thereof interposed between said ends is deflected and said undercut ends lie adjacent thereto, said outer radial surfaces of said member being thereby rendered relatively smooth, said ends being parallel and angularly displaced sufficiently whereby no more than two full thicknesses of said member in an axial direction are presented at all portions thereof.

2. In combination with an annular sealing member disposed in an annular groove and substantially filling the same in a radial direction, an anti-extrusion device for said sealing member comprising a normally helical deflectable polytetrafluoroethylene member disposed in said groove adjacent said sealing member, said normally helical member being dimensioned to substantially fill said groove in a radial direction and having a substantially rectangular cross section, each end of said normally helical member being undercut with respect to its outer radial surface, the undercut surfaces of said ends being arranged in a straddling parallel relationship to a radius of the helix of said member whereby when said normally helical member is subjected to axial loads the same deflects between said undercut ends so that said ends lie adjacent a portion of said helix therebetween and present substantially smooth outer radial surfaces for precluding damage to said sealing member.

3. In combination with a relatively soft annular O-ring sealing member disposed in an annular groove of substantially rectangular cross section, an anti-extrusion arrangement for said sealing member comprising a normally helical deflectable polytetrafluoroethylene member in said groove on either side of said sealing member, each of said normally helical members being dimensioned to substantially fill said groove in a radial direction and having a substantially rectangular cross section, the ends of each of said helical members being undercut with respect to the outer radial surfaces thereof, and in a spaced parallel relationship whereby when each of said helical members is subjected to axially compressive forces the portion thereof interposed between said ends is deflected and said undercut ends lie adjacent thereto, said outer radial surfaces of said member being thereby rendered smooth, said spacing between said end surfaces being sufficiently great so that no more than two full thicknesses of said helical members in an axial direction are presented at all portions thereof.

4. An anti-extrusion device for an annular groove sealing member, said device comprising a non-metallic flexible deflectable normally helical member of two turns adapted to lie in a groove adjacent the sealing member, said helical member being of substantially rectangular cross section, each end thereof being undercut at substantially 30 degree angle to its outer radical surface whereby when said member is subjected to axially compressive forces the portion thereof interposed between said ends is deflected and said undercut ends lie adjacent thereto, said outer radial surfaces of said member being thereby rendered relatively smooth, said ends being parallel and angularly displaced sufficiently whereby no more than two full thicknesses of said member in an axial direction are presented at all portions thereof.

References Cited in the file of this patent

UNITED STATES PATENTS

| | | |
|---|---|---|
| 1,130,615 | Laursen | Mar. 2, 1915 |
| 1,229,258 | Haas | June 12, 1917 |
| 1,819,890 | Gleason | Aug. 18, 1931 |
| 1,958,313 | Powell | May 8, 1934 |
| 2,349,170 | Jackman | May 16, 1944 |
| 2,456,356 | Aber | Dec. 14, 1948 |
| 2,749,193 | Traub | June 5, 1956 |